350-174         SR
3/15/77         OR      4,012,123

United States Patent [19]
Fuller

[11] 4,012,123
[45] Mar. 15, 1977

[54] BINOCULAR DEVICE FOR DISPLAYING NUMERICAL INFORMATION IN FIELD OF VIEW

[75] Inventor: Harry V. Fuller, Newport News, Va.

[73] Assignee: The United States of America as represented by the Administrator of the National Aeronautics and Space Administration, Washington, D.C.

[22] Filed: Aug. 28, 1975

[21] Appl. No.: 608,482

[52] U.S. Cl. .............................. 350/174; 350/145
[51] Int. Cl.² ........................................ G02B 27/14
[58] Field of Search ............ 350/174, 169, 145, 35, 350/36, 10

[56] References Cited
UNITED STATES PATENTS

| | | | |
|---|---|---|---|
| 3,170,979 | 2/1965 | Baldwin et al. | 350/174 |
| 3,614,314 | 10/1971 | Rossire | 350/174 |

Primary Examiner—John K. Corbin
Assistant Examiner—Jon W. Henry
Attorney, Agent, or Firm—Howard J. Osborn; William H. King; John R. Manning

[57] ABSTRACT

Apparatus for superimposing numerical information on the field of view of binoculars. The invention has application in the flying of radio-controlled model airplanes. Information such as, for example, airspeed and angle of attack are sensed on a model airplane and transmitted back to earth where this information is changed into numerical form. Optical means are attached to the binoculars, that a pilot is using to track the model airplane, for displaying the numerical information in the field of view of the binoculars. The optical means includes means for focusing the numerical information at infinity whereby the user of the binoculars can see both the field of view and the numerical information without refocusing his eyes.

7 Claims, 4 Drawing Figures

BINOCULAR DEVICE FOR DISPLAYING NUMERICAL INFORMATION IN FIELD OF VIEW

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

Radio-controlled model airplanes are sometimes used in flight research programs. When a model is used, a ground-based pilot sometimes tracks the model with binoculars and based on this information performs certain maneuvers with respect to the model. In addition to having the model in the field of view of the binoculars, the pilot also needs information about the model, such as, for example, angle of attack and airspeed for making his decisions. These decisions have to be made in a very short interval of time. Hence, it is necessary that the pilot view both the field of view of the binoculars and the information from the model at the same time. It is therefore the primary object of the invention to display in the field of view of binoculars numerical information about the object being viewed.

It is also important that the pilot be able to simultaneously see the field of view of the binoculars and the numerical information without refocusing his eyes. Thus, another object of the invention is to provide numerical information in the field of view of binoculars such that the user of the binoculars does not have to refocus his eyes in order to see both the field of view and the numerical information.

SUMMARY OF THE INVENTION

Sensors are attached to a model airplane to sense information such as airspeed and angle of attack. The sensors are connected to individual voltage controlled oscillators and the measurements are telemetered to ground using standard FM-FM telemetry techniques. The measured information is received on the ground, the FM signals are discriminated and the resulting analog signals are converted to binary coded deciman (BCD). The information is then routed to two sets of seven-segment incandescent readouts through BCD to seven-segment decoders.

An optical system, including the incandescent readouts, is mounted on the underside of one barrel of the binoculars. A system of lenses and mirrors is used to bring an image of the readout to the pilot's eye. The image is focused at infinity by means of a collimating lens thereby enabling the pilot to see the information above his view of the model without refocusing his eyes.

DETAILED DESCRIPTION OF THE INVENTION

Figure 1:
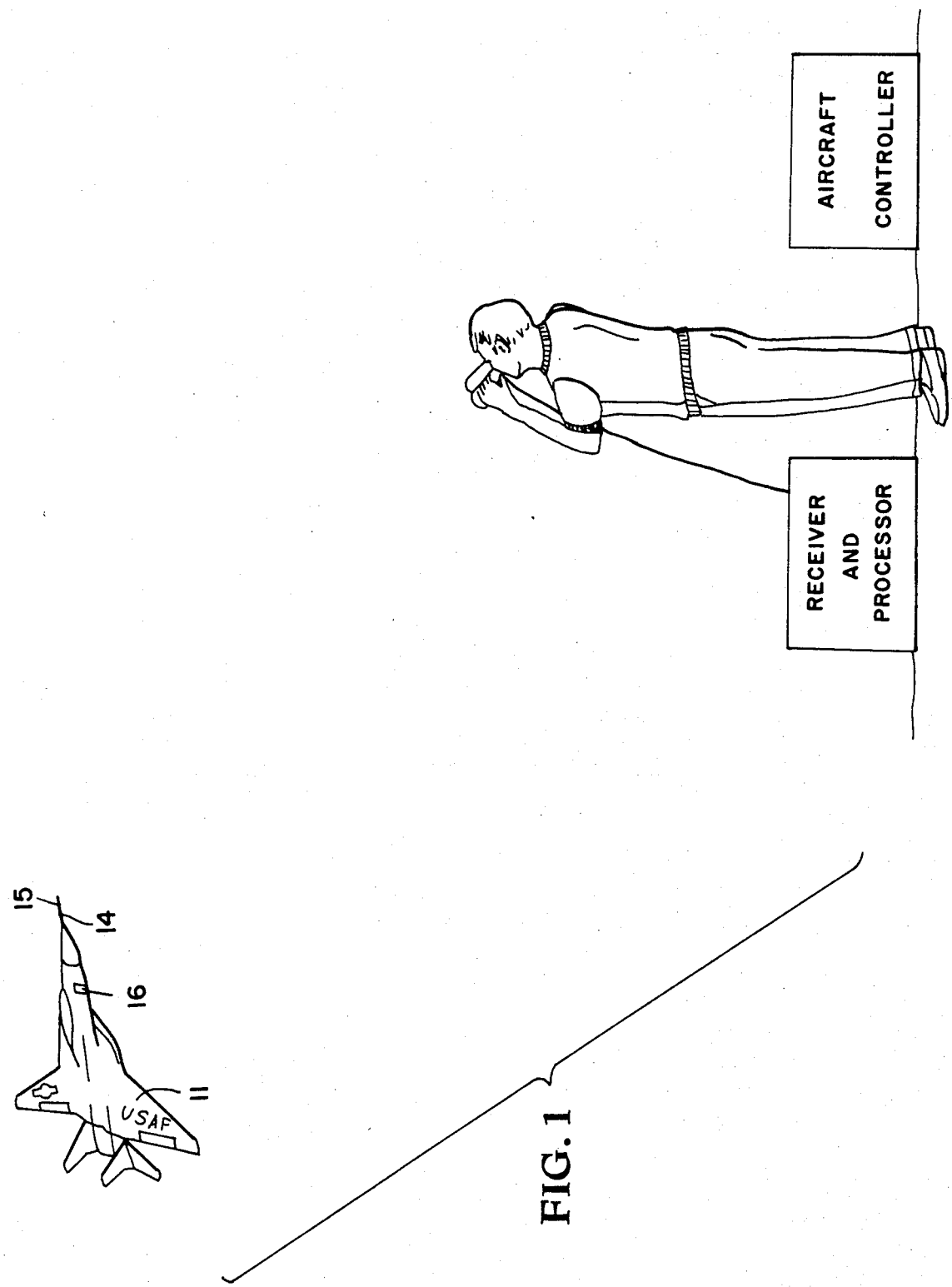
FIG. 1 is the schematic drawing for the purpose of describing how the invention is used.

Turning now to the embodiment of the invention selected for illustration in the drawings, the number 11 in FIG. 1 designates a model airplane that is tracked by a pilot 12 by means of binoculars 13. Located on the model airplane are sensors 14 and 15 for sensing the angle of attack and airspeed of the model, respectively. These signals from sensors 14 and 15 are transmitted by means of an FM transmitter 16 to a receiver and processors 17 located near the pilot. The received signals are converted to numerical form by means of the processor and displayed in the field of view of the binoculars 13. Hence, the pilot can simultaneously observe the model 11 and the readings of airspeed and angle of attack. With the aid of this information he can maneuver the model by means of an aircraft controller 17. Even though this invention displays airspeed and angle of attack, it is to be understood that other information can be displayed without departing from the invention.

Figure 2:
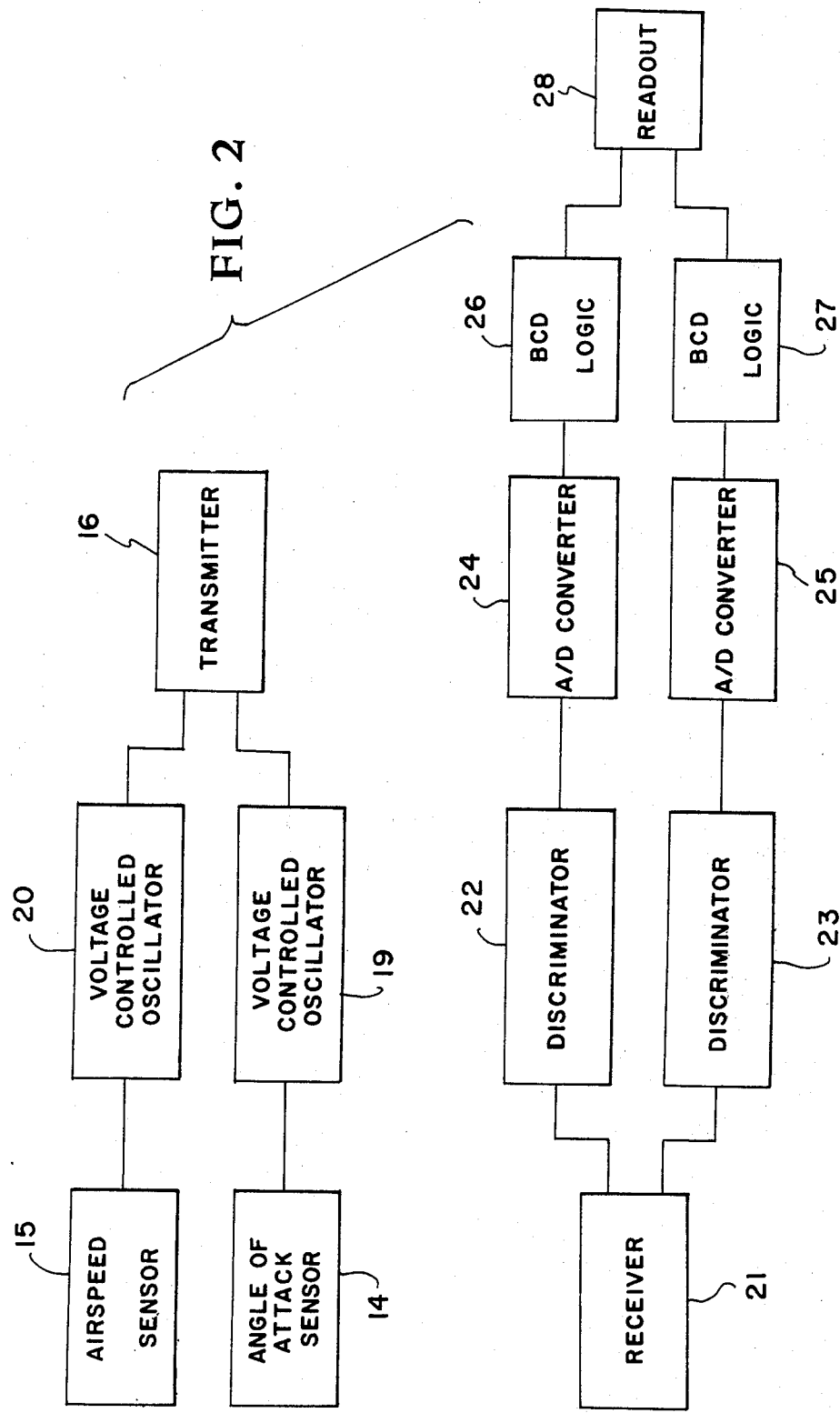
FIG. 2 is a block diagram of the electronics used by the invention.

The analog outputs of sensors 14 and 15 are converted to frequencies by voltage controlled oscillators 19 and 20, respectively, as shown in FIG. 2, and then transmitted to ground by means of transmitter 16. The signals transmitted by transmitter 16 are received by receiver 21 and then applied to discriminators 22 and 23. The analog signals at the output of discriminators 22 and 23 are converted to digital signals by means of analog-to-digital converters 24 and 25, respectively. The digital signals at the output of analog to digital converters 24 and 25 are converted to binary coded decimal signals by means of BCD logic circuits 26 and 27, respectively. The output of logic circuits 26 and 27 are converted to numerical form by incandescent readout 28. The electronic components disclosed in FIG. 1 are standard components and are therefore not disclosed in detail in this specification.

Figure 3:
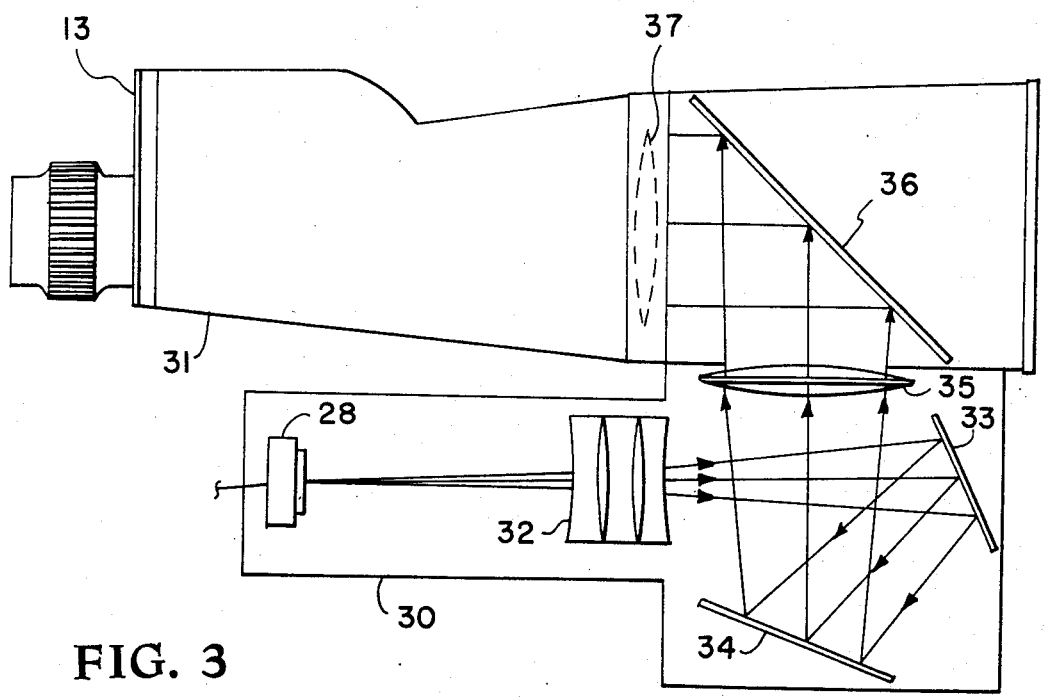
FIG. 3 is a schematic drawing of the optical system used by the invention.

The optical system for this invention as shown in FIG. 3 is all included in a housing 30 that is attached to one barrel 31 of binoculars 13. The numbers produced by readout 28 are passed through a negative lens 32 onto a mirror 33 which reflects them onto a mirror 34. The reflection of mirror 34 is passed through collimating lens 35 which renders all the light rays from the readout 28 parallel. A beam splitter 36 reflects the parallel rays from the collimating lens 35 into the objective lens 37 of the binoculars. Beam splitter 36 also allows the rays from the field-of-view of binoculars to pass through it to the objective lens 37.

The total length of the optical path from readout 28 to objective lens 37 is small, 305 mm, and the path is folded by means of the mirrors 33 and 34 so that all the elements of the optical system can be boxed compactly under one barrel of the binoculars.

Since the pilot has a display attached to one barrel of his binoculars and the other barrel free, the beam splitter causes some difference in brightness of external light; but it is small and not objectionable to the pilot.

Because the readouts are relatively large (7.82 mm in height) and their images are magnified by the binoculars (7 power magnification and 50 mm diameter objective lens binoculars are used), the optical system reduces the size of the images presented to the binoculars. Since the readouts are 7.82 mm high and the optical path is 305 mm long, the readouts subtend an angle of 1.47°. When this angle is magnified seven times by the binoculars, it becomes 10.3°. Three element negative lens 32 is used to reduce the angle to approximately 2°. Each element of the negative lens has a focal length of −33 mm and a diameter of 25 mm.

Figure 4:
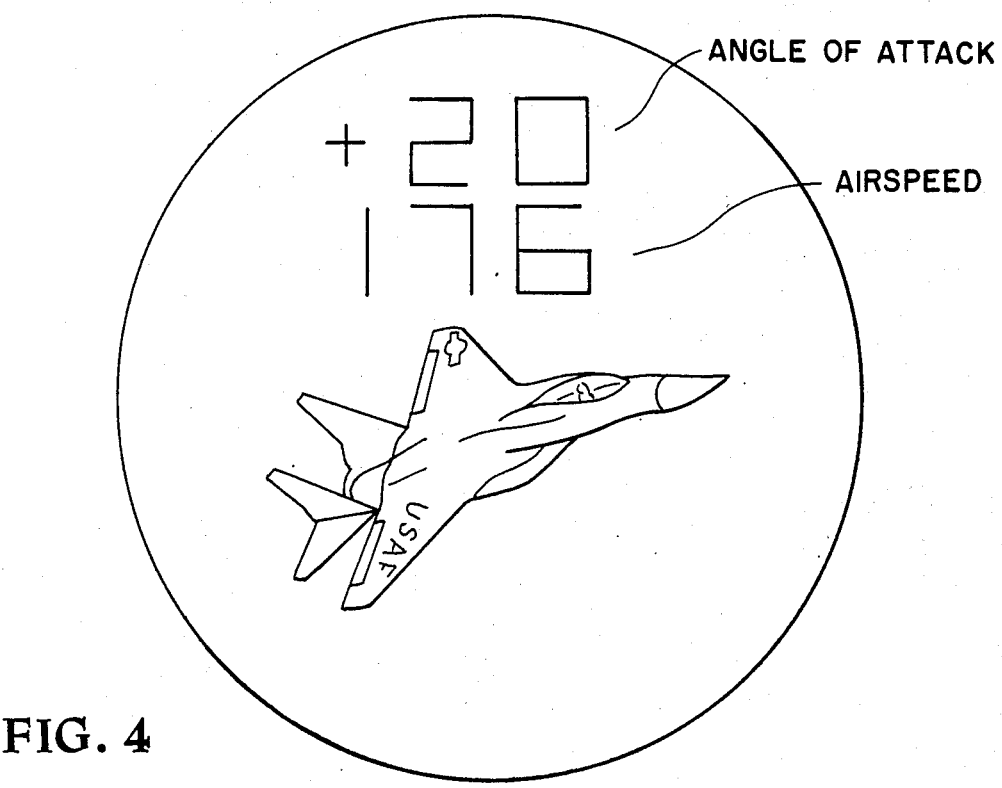
FIG. 4 is a schematic pictorial drawing of what the user of the binocular sees.

FIG. 4 is a pictorial view of what the pilot sees when he is looking through his binoculars. He sees not only the model airplane but the numbers indicative of both the angle of attack and airspeed of the model airplane. Inasmuch as the beam splitter 36 passes light through it, the numbers block only that portion of the field of view in which the numbers themselves occupy.

Even though this invention has been described for use in controlling model airplanes, it is to be understood that its application can be much broader. That is, it can be used to display the field of view of any object and numerical information about that object.

The advantages of this invention are that its user can simultaneously observe an object in the field of view of binoculars and numerical information about that object. Also, because of the collimating lens, the user can simultaneously observe both the field of view and the numerical information without refocusing his eyes. In addition, since the beam splitter reflects and transmits light, the area occupied by the numerical information is kept to a minimum. That is, the field of view of the binoculars around the numerical information is not blocked.

What is claimed is:

1. Apparatus for displaying, in the field of view of binoculars, numerical information about an object being viewed by the binoculars comprising:
    binoculars, including an objective lens and two barrels;
    means for sensing information about said object;
    transmitter means for transmitting said information;
    receiver means for receiving said transmitted information;
    means for transforming said received information into numerical form and displaying it on an incandescent readout; and
    optical means attached to said binoculars for superimposing said incandescent readout onto the field of view of said binoculars.

2. Apparatus according to claim 1 wherein said optical means includes means for focusing said incandescent readout at infinity whereby the user of said binoculars does not have to refocus his eyes to see both the object and the incandescent readout.

3. Apparatus according to claim 2 wherein said means for focusing said incandescent readout at infinity is a collimating lens.

4. Apparatus according to claim 1 wherein said optical means includes a beam splitter that reflects the incandescent readout and transmits the light from the field of view of the binoculars.

5. Apparatus according to claim 1 wherein said optical means includes:
    a collimating lens;
    means for directing an image of said incandescent readout into said collimating lens; and
    means mounted in front of one barrel of said binoculars for transmitting light from the field of view of said binoculars and for reflecting the image of said incandescent readout from said collimating lens onto the objective lens of said binoculars.

6. Apparatus according to claim 5 wherein said means for directing an image of said incandescent readout into said collimating lens includes a negative lens.

7. Apparatus according to claim 6 wherein said means for directing an image of said incandescent readout into said collimating lens includes mirror means.

* * * * *